United States Patent [19]

Clarke

[11] Patent Number: 5,623,646
[45] Date of Patent: Apr. 22, 1997

[54] CONTROLLING PROCESSING CLOCK SIGNALS

[75] Inventor: Keith S. P. Clarke, Papworth Everard, United Kingdom

[73] Assignee: Advanced RISC Machines Limited, Cambridge, United Kingdom

[21] Appl. No.: 528,475

[22] Filed: Sep. 12, 1995

[30] Foreign Application Priority Data

May 9, 1995 [GB] United Kingdom ............. 9510205

[51] Int. Cl.⁶ .................................................. G06F 1/10
[52] U.S. Cl. .......................................................... 395/560
[58] Field of Search ........................................... 395/550

[56] References Cited

U.S. PATENT DOCUMENTS

4,851,987  7/1989  Day ............................. 364/DIG. 1
5,392,437  2/1995  Matter et al. ..................... 395/550 X
5,471,625  11/1995 Mussemann et al. ............. 395/550 X
5,546,568  8/1996  Bland et al. ......................... 395/550

*Primary Examiner*—Thomas M. Heckler
*Attorney, Agent, or Firm*—Albert C. Smith

[57] ABSTRACT

A data processing system is provided in which the central processing unit clock signal (mclk, fclk) to a central processing unit core (14) may be suspended to reduce power consumption. This suspension is controlled by a suspend controller (20) that responds to a write request to a predetermined address (0x0320001C) to hold asserted a bus request signal (REQ) that cooperates with a bus controller (18) to block the central processing unit clock signal. The central processing unit core sees the suspend mode as a write request of an indefinite length. The suspend controller is responsive to an asynchronous input signal (FIQ, IRQ, EVENT1) to exit the suspend mode by issuing a bus acknowledge signal (ACK) and removing the block on the central processing unit clock signal.

15 Claims, 6 Drawing Sheets

CONTROLLING PROCESSING CLOCK SIGNALS

BACKGROUND OF THE INVENTION

1. Field of the Invention

This invention relates to the field of data processing systems. More particularly, this invention relates to the control of clock signals within such data processing systems.

2. Description of the Prior Art

Data processing systems include clock signals that control, regulate and drive many of the operations of the data processing apparatus. The frequency of the clock signal that is used is often a determining factor in the overall system performance since a given data processing operation may be constrained to take a fixed number of clock cycles rather than a particular time period. Accordingly, it is desirable to use as fast a clock signal as possible.

A problem with fast clock signals is that they result in an increase in power consumption. Even within the small physical size of an integrated circuit, the circuit elements and interconnecting lines have a finite capacitance resulting in a significant current flow, and consequential power consumption, as these elements and lines follow the controlling clock signal potential. This increase in power consumption within integrated circuits leads to a number of problems, e.g. potentially destructive circuit heating that requires additional heat dissipation measures to overcome.

A particular conflict between the desire for high clock speeds and other considerations arises in the field of small portable devices. With these devices available battery power is often a significant limitation and so any measures that can reduce power consumption whilst maintaining system performance are strongly advantageous.

In view of the above, specific integrated circuits have been designed for use in portable computers that allow the clock speed to be selected between a high clock speed used when significant data processing activity is required and a much lower clock speed for use when the required amount of data processing is low, e.g. the system is waiting for an input from elsewhere, such as a user input.

Whilst selectable clock speed reduces average power consumption, further reduction is advantageous.

It has been proposed in European Published Patent Application EP-A-0 562 885 to provide a system in which the clock signal supplied to a central processing unit may be stopped in certain circumstances. In this proposed system, the central processing unit has within its instruction set a HALT instruction which acts as a busy wait state in which the clock signal is usually maintained but processing does not progress any further until an interrupt occurs.

The system proposed in EP-A-0 562 885 adds additional circuitry that detects the occurrence of such HALT commands and responds by disabling the supply of the clock signal to portions of the circuit. Thus, for those portions, the clock is stopped rather than merely slowed and an improved power consumption saving is made.

The proposed system of EP-A-0 562 885 suffers from a number of disadvantages. The system proposed in EP-A-0 562 885 assumes the existence of a HALT command within the central processing unit instruction set. Whilst the provision of such a command is not a problem when operating in a complex instruction set computing (CISC) environment, when operating in a reduced instruction set computing (RISC) environment it is disadvantageous to increase the overall size of the instruction set.

A further disadvantage of the system of EP-A-0 562 885 is that it relies upon the occurrence of interrupt signals to exit from the mode in which the clock is stopped. Interrupt signals have associated with them various interrupt handling routines and it is a disadvantageous constraint to always have to execute such an exception handling routine when restarting the clock signal. Furthermore, the need to have an interrupt to exit the clock stopped mode limits the circumstances in which the technique may be used.

It is an object of the invention to address the abovementioned problems.

SUMMARY OF THE INVENTION

Viewed from one aspect this invention provides apparatus for processing data, said apparatus comprising:

(i) a central processing unit core driven by a central processing unit clock signal for performing data processing in response to program instructions;

(ii) an asynchronous signal input coupled to said central processing unit core for receiving asynchronous input signals;

(iii) a signal bus for transferring signals between said central processing unit core, data storage means and one or more further circuits all coupled to said signal bus;

(iv) a bus controller for controlling access to said signal bus by said central processing unit, said data storage means and said one or more further circuits and for supplying said central processing unit clock signal to said central processing unit core; clock suspending means responsive to a program instruction initiated write request by said central processing unit core to a predetermined address in said data storage means for issuing a request signal to said bus controller such that said bus controller suspends driving of said central processing unit core by said central processing unit clock signal whilst allowing said data storage means and said one or more further circuits to continue to communicate via said signal bus; and (v) clock resuming means responsive to an asynchronous input signal applied to said asynchronous signal input issuing an acknowledge signal to said bus controller such that said bus controller resumes driving of said central processing unit core by said central processing unit clock signal.

The invention overcomes the above mentioned problems by using an existing instruction within the instruction space to trigger the suspending of the central processing unit clock signal whilst allowing asynchronous input signals other than merely interrupt signals to trigger resuming of the central processing unit clock signal. Furthermore, during the suspension of the central processing unit clock signal, other circuit blocks may continue to communicate via the signal bus as appropriate.

An additional feature of the invention is that existing structure and function of the bus controller is utilised to provide operation in accordance with the invention by providing that said clock suspending means issues a write request signal to said bus controller when said central processing unit core writes to said predetermined address such that said bus controller suspends the central processing unit clock signal and thereafter waits for a write acknowledge signal before resuming the central processing unit clock signal.

In preferred embodiments of the invention said data storage means includes a video data memory and said one of mope further circuits include a video driver circuit such that said video driver circuit may access and refresh said video data memory whilst driving of said central processing unit core by said central processing unit clock is suspended.

The ability for a video driver circuit to continue to be able to access the video data memory is particularly advantageous as it allows the screen display and the video data memory to be refreshed. In this way, the display can continue unaltered despite the suspending of the central processing unit clock and a user may be unaware that the power saving feature of the invention is in operation.

As will be appreciated, the asynchronous input signals can take many different forms. However, in preferred embodiments there is provided a user input interface circuit for generating a asynchronous input signal at said asynchronous signal input in response to a user input so as to trigger resumption of driving of said central processing unit core by said central processing unit clock signal.

It is often the case that the central processing unit core will have little data processing to perform whilst it is waiting for the next user input. Accordingly, the suspending of the central processing unit clock whilst awaiting for the next user input signal is strongly advantageous.

In preferred embodiments of the invention said user input interface circuit comprises a keyboard interface circuit and wherein said central processing unit core and said bus controller together act to suspend said central processing unit clock whilst waiting for a keyboard input signal to said keyboard interface circuit.

The power savings available from the invention and the manner in which the suspend mode may be entered and exited make it possible to suspend the central processing unit core between individual key strokes as a power saving measure.

Whilst suspending the clock signal to the central processing unit core saves a considerable amount of power, still further power can be saved in preferred embodiments in which said clock suspending means suspends a further circuit clock signal driving one of mope of said further circuits when suspending said central processing unit clock signal and said clock resuming means resumes said further circuit clock signal when resuming said central processing unit clock signal.

In contrast to the previously proposed system discussed above, preferred embodiments of the invention allow an additional degree of sophistication in the control of the clock signals by providing that said clock suspending means selectively suspends said further circuit clock signal in dependence upon a data value written to said predetermined address.

Whilst the invention may be used in systems having only one type of asynchronous input signal, it is preferable that the system includes a plurality of asynchronous input signals that may serve to resume the central processing unit clock signal.

When the central processing unit clock signal is suspended, e.g. whilst expecting a user input, it is important that the system should still be responsive to interrupts. Accordingly, preferred embodiments of the invention further comprise one of more interrupt signal inputs coupled to said central processing unit core for receiving interrupt signals, said clock resuming means being responsive to received interrupt signals to resume said central processing unit clock signal and said central processing unit core being responsive to received interrupt signals to initiate an interrupt handling routine.

Whilst certain of the circuit elements of the invention could be fabricated separately, it is preferable that said central processing unit core, said bus controller, said clock suspending means and said clock resuming means are formed as a central processing unit integrated circuit.

It will be appreciated that data storage means (e.g. any devices corresponding to a portion of the address space) may take many different forms, e.g. a DRAM, a SRAM, a VRAM, ..., but by virtue of the particular special properties associated with the predetermined address within the data storage means it is preferable that said data storage means includes a data register, said predetermined address corresponding to said data register.

Whilst the data storage means can be considered as the full memory address space of the system, it will be appreciated that this is usually sub-divided. In preferred embodiments of the invention said data storage means includes a random access memory, said random access memory being formed as a random access memory integrated circuit coupled to said central processing unit core, said bus controller, said clock suspending means and said clock resuming means.

As previously mentioned, the ability to control which of the various clock signals within the system are suspended in dependence upon the data value written to the predetermined address is advantageous, this is particularly so when said further circuit clock signal is an input/output device clock signal that is supplied at an external pin of said central processing unit integrated circuit.

An input/output device clock signal that is driven off-chip can consume a particularly large amount of power due to the relatively high capacitance of such off-chip lines.

If still further power saving is desired, then preferred embodiments may provide this when said central processing unit core is responsive to predetermined program instructions to assert a stop signal that stops clock signal generation such that no communication may take place via said signal bus.

Such a stop mode is more drastic than the suspend mode previously discussed and will generally produce a noticeable effect to the user, e.g. a lack of screen refresh or a longer time to recover the system back to the fully operational state.

Such an approach makes modification of an existing design possible rather than having to re-engineer the system more comprehensively.

Whilst the clock suspending means and the clock resuming means may be separately embodied, in preferred embodiments these two entities are provided as a suspend controller circuit block.

Viewed from another aspect the invention provides a method of processing data, said method comprising the steps of:

(i) driving a central processing unit core by a central processing unit clock signal for performing data processing in response to program instructions;

(ii) receiving asynchronous input signals at an asynchronous signal input coupled to said central processing unit core;

(iii) transferring signals via a signal bus between said central processing unit core, a data memory and one or more further circuits all coupled to said signal bus; and (iv) controlling with a bus controller access to said signal bus by said central processing unit, said data memory and said one or mope further circuits;

(v) supplying said central processing unit clock signal from said bus controller to said central processing unit core;

(vi) responding to a program instruction initiated write request by said central processing unit core to a predetermined address in said data storage means by issuing a request to said bus controller such that said bus controller suspends driving of said central processing unit core by said central processing unit clock signal whilst allowing said data storage means and said one or more further circuits to continue to communicate via said signal bus; and (vii) responding to an asynchronous input signal applied to said asynchronous signal input by issuing an acknowledge signal to said bus controller such that said bus controller resumes driving of said central processing unit core by said central processing unit clock signal.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
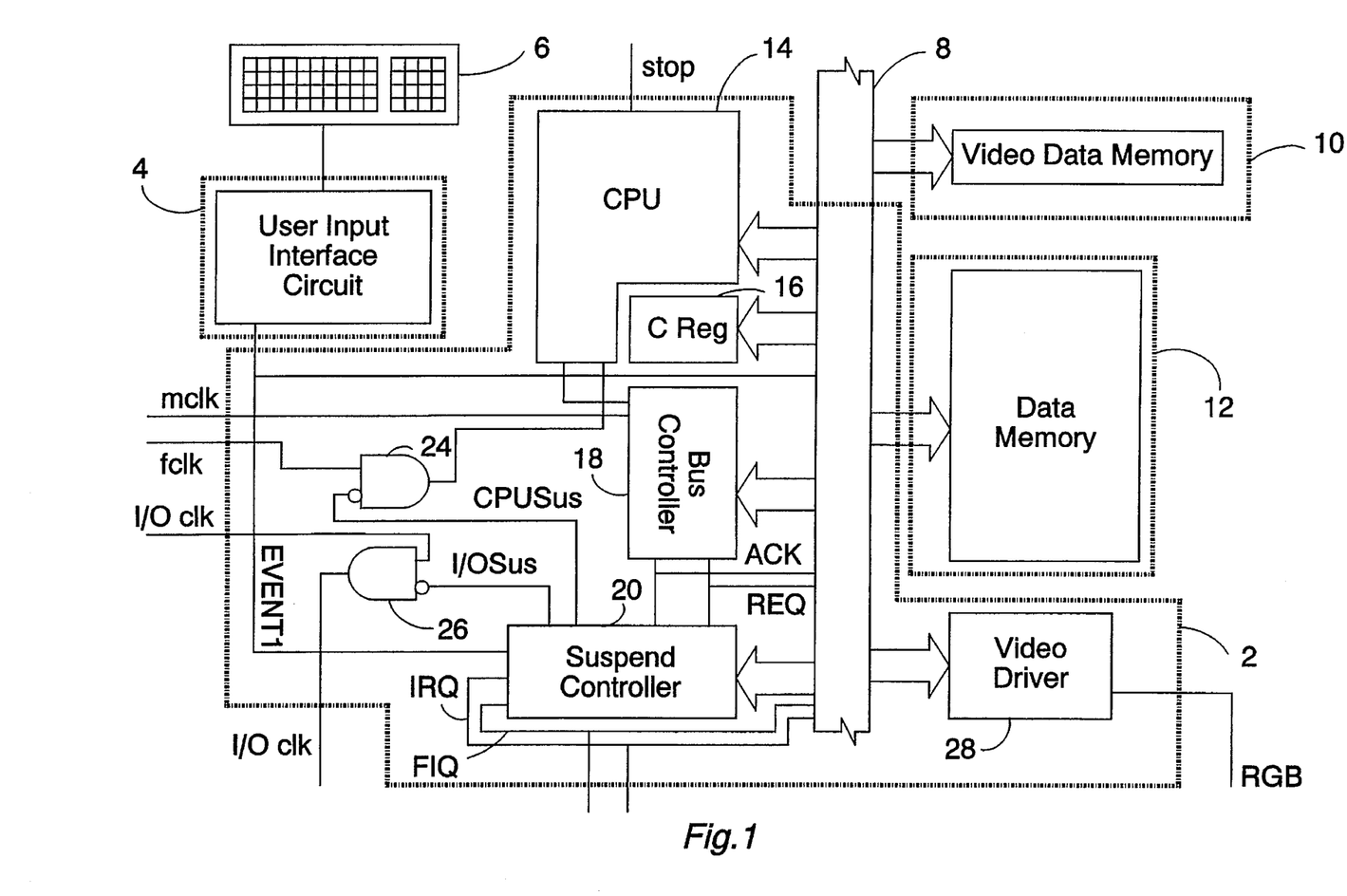
FIG. 1 illustrates a data processing system in which the central processing unit clock may be suspended.

FIG. 1 illustrates a central processing unit integrated circuit 2 connected via a user input interface circuit 4 to a keyboard 6 and via a signal bus 8 to a video data memory 10 and a random access memory 12. The central processing unit integrated circuit 2 receives inputs that include a memory clock signal mclk, a fast clock signal fclk and an input/output clock signal I/O clk. The signal bus 8 extends outside of the central processing unit integrated circuit 2 such that the video data memory 10 and random access memory 12 may communicate address and data words with the rest of the system. A fast interrupt signal FIQ and a slow interrupt signal IRQ are also input to the central processing unit integrated circuit 2 along with a first asynchronous event signal EVENT1 from the user input interface circuit 4. The I/O clk signal is driven out from the central processing unit integrated circuit 2 and serves to supply additional I/O circuits, such as hard disc controllers and the like. A stop signal is input that serves to freeze the central processing unit integrated circuit 2 completely.

Within the central processing unit integrated circuit 2 there is a central processing unit core 14 that contains the main processing circuit elements, such as the instruction pipeline, instruction decoder and processing logic. The central processing unit core 14 is coupled to the signal bus 8. A control register bank 16 containing the control registers and status flags for the integrated circuit 2 communicates with the central processing unit core 14 via the signal bus 8. A bus controller 18 is coupled to the signal bus 8 to provide co-ordination and arbitration between bus communication operations using bus request REQ and bus acknowledge ACK signals. A suspend controller 20 is coupled to the signal bus 8 and additionally receives the interrupt signals FIQ and IRQ and the asynchronous event signal EVENT1. The suspend controller 20 serves to generate pseudo bus request REQ and bus acknowledge ACK signals as well as a CPUSus signal and a I/OSus signal. AND gates 24 and 26 with one inverted input receive the fast clock signal fclk and input/output signal I/O clk as well as the CPUSus and I/OSus signals.

A video driver circuit 28 within the central processing unit integrated circuit 2 serves to generate an RGB signal in response to display data received from the video data memory 10 via the signal bus 8.

Figure 2:
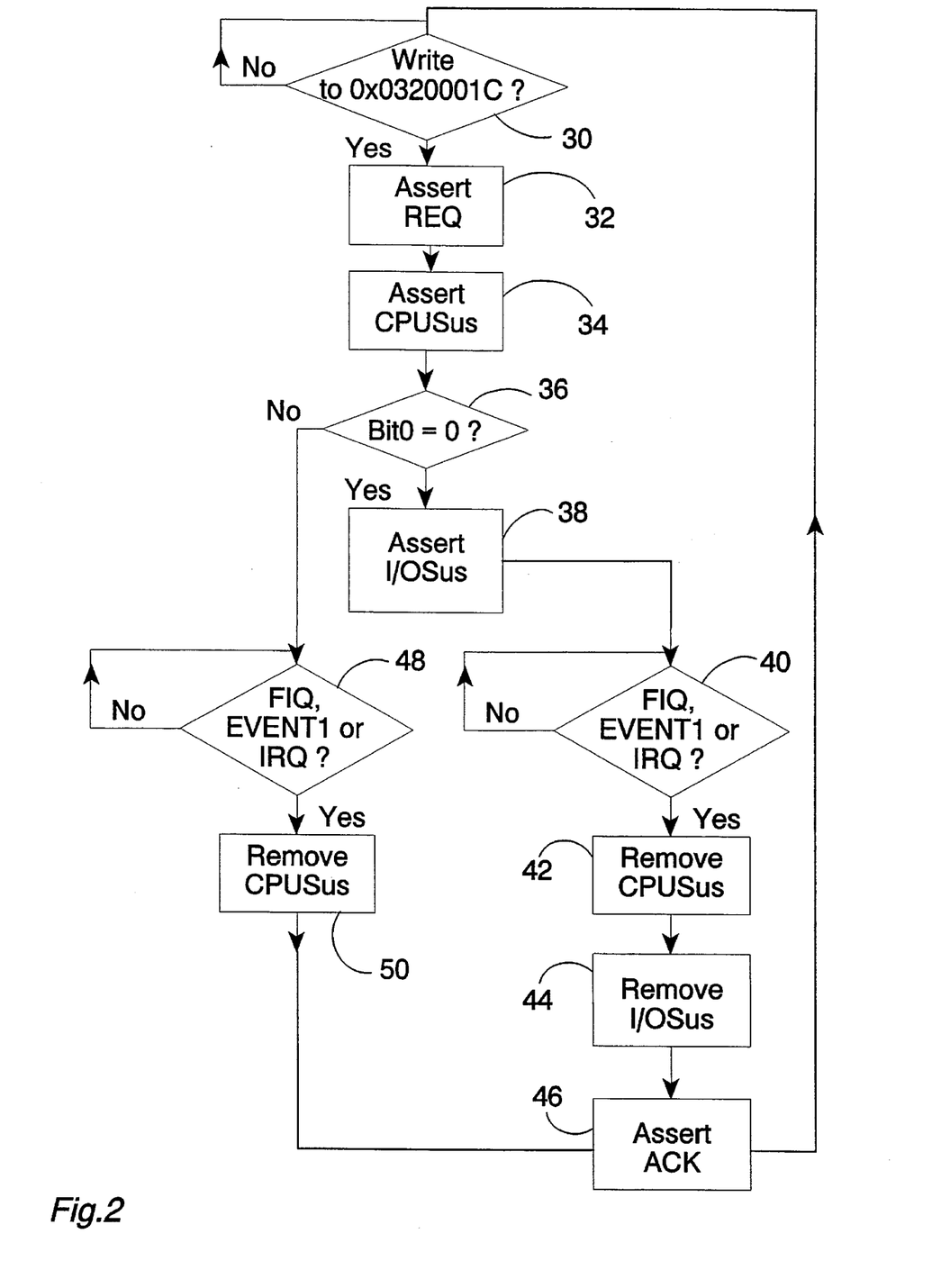
FIG. 2 is a flow diagram illustrating the functional flow of suspending and resuming the central processing unit clock of FIG. 1.

FIG. 2 illustrates the operation of the suspend controller 20 of FIG. 1. At step 30, the suspend controller 20 monitors the signal bus 8 to detect a write request to address 0x0320001C (0x indicates that the following number is hexidecimal). The address 0x0320001C is within the address space normally reserved for control registers, although a physical register need not necessarily be provided.

When such a write request is detected at step 30, steps 32 and 34 serve to hold asserted the (pseudo) bus request signal REQ and the CPUSus signal. The CPUSus signal acts on the AND gate 24 to block the supply of the fast clock signal fclk to the central processing unit core 14 whilst the bus request signal REQ causes the bus controller 18 to block the memory clock signal mclk. Accordingly, the assertion of the bus request signal REQ and the stopping of the central processing unit clock to the central processing unit core 14 has the result that the central processing unit 14 maintains a fixed state, so saving a significant amount of power, and the bus controller 18 sees what appears to be a long bus request signal REQ.

At step 36, the suspend controller 20 determines the value of the least significant bit Bit0 of the data value being written to address 0x0320001C. If this bit is a "0" then this indicates that the input/output clock signal I/O clk should also be suspended (otherwise this signal is not suspended). If Bit0=0, then the I/OSus signal is asserted at step 38. The I/OSus signal acts with the AND gate 26 to block the supply of the I/O clk signal.

At step 40, the suspend controller 20 monitors for an asynchronous input signal that may be a fast interrupt FIQ, a slow interrupt IRQ or an asynchronous event signal EVENT1. When such a signal occurs, steps 42 and 44 remove the blocking of the central processing unit clock signals and the I/O clock signal by the AND gates 24 and 26.

Step 46 serves to assert the bus acknowledged signal ACK that causes the bus controller 18 to unblock the memory clock signal mclk.

If at step 36 the determination was Bit0=1, then step 48 monitors for the occurrence of an asynchronous input signal and step 50 serves to remove the CPUSus signal before passing control to step 46.

Figure 3:
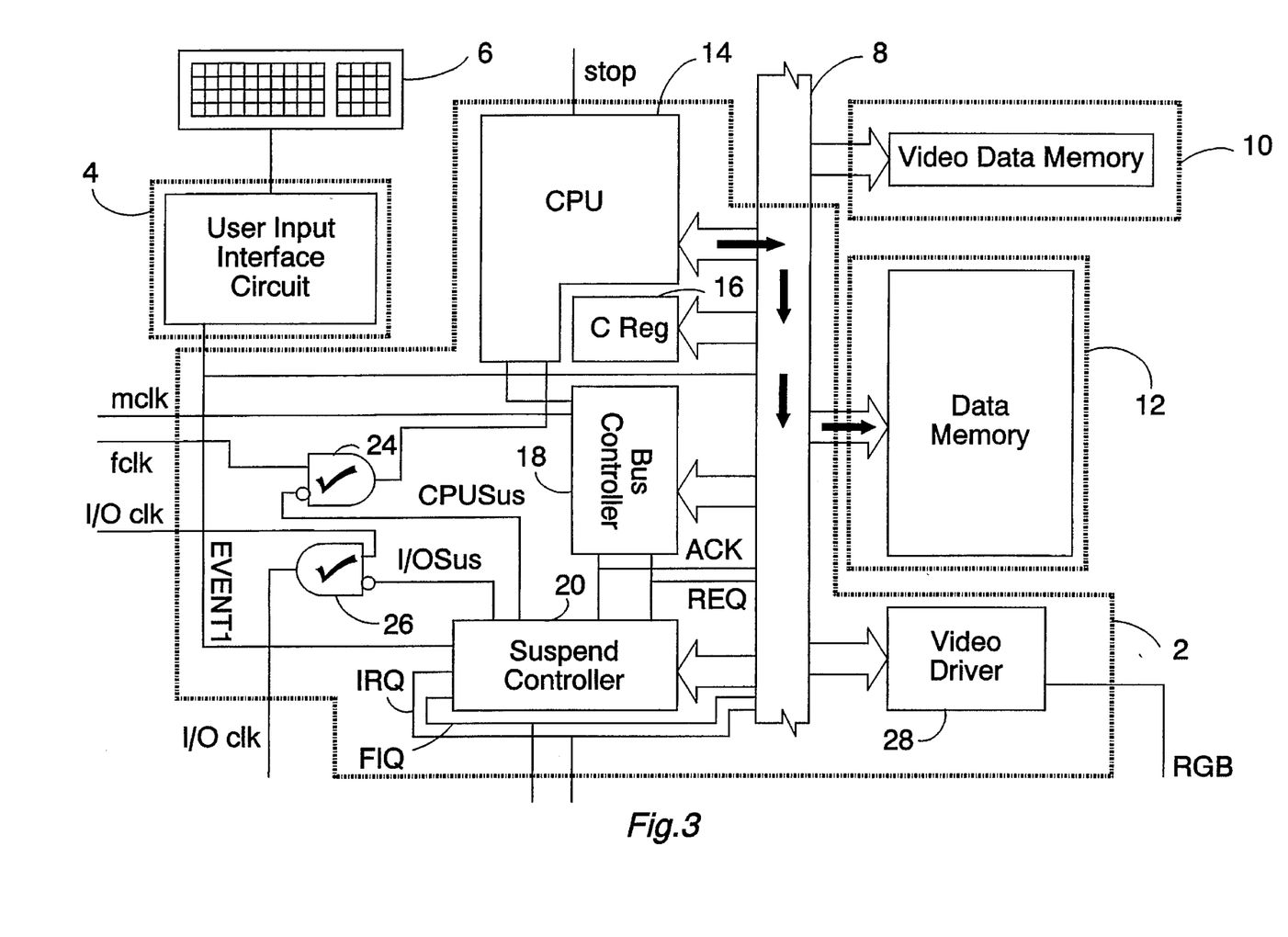
FIGS. 3 to 6 illustrate various modes of operation of the system of FIG. 1.

FIG. 3 illustrates the operation of the system of FIG. 1 in one of its normal modes. In this mode, both the memory clock signal mclk and the fast clock signal fclk are enabled to the central processing unit core 14. The central processing unit core 14 makes a selection between these two clock signals as to which one to internally utilise depending upon the nature of the operation being performed by the central processing unit core at that point in time. The I/O clk signal is also enabled. A write request from the central processing unit core 14 to the random access memory 12 is passed by the signal bus 8 that carries both the address word and the data words. At the start of this bus communication operation, a bus request signal REQ is issued by a memory controller (not shown) to the bus controller 18 that then allocates the signal bus to that bus communication operation until it is completed, at which time a bus acknowledge signal ACK is issued to release the signal bus 8 for use by other circuit elements.

Figure 4:
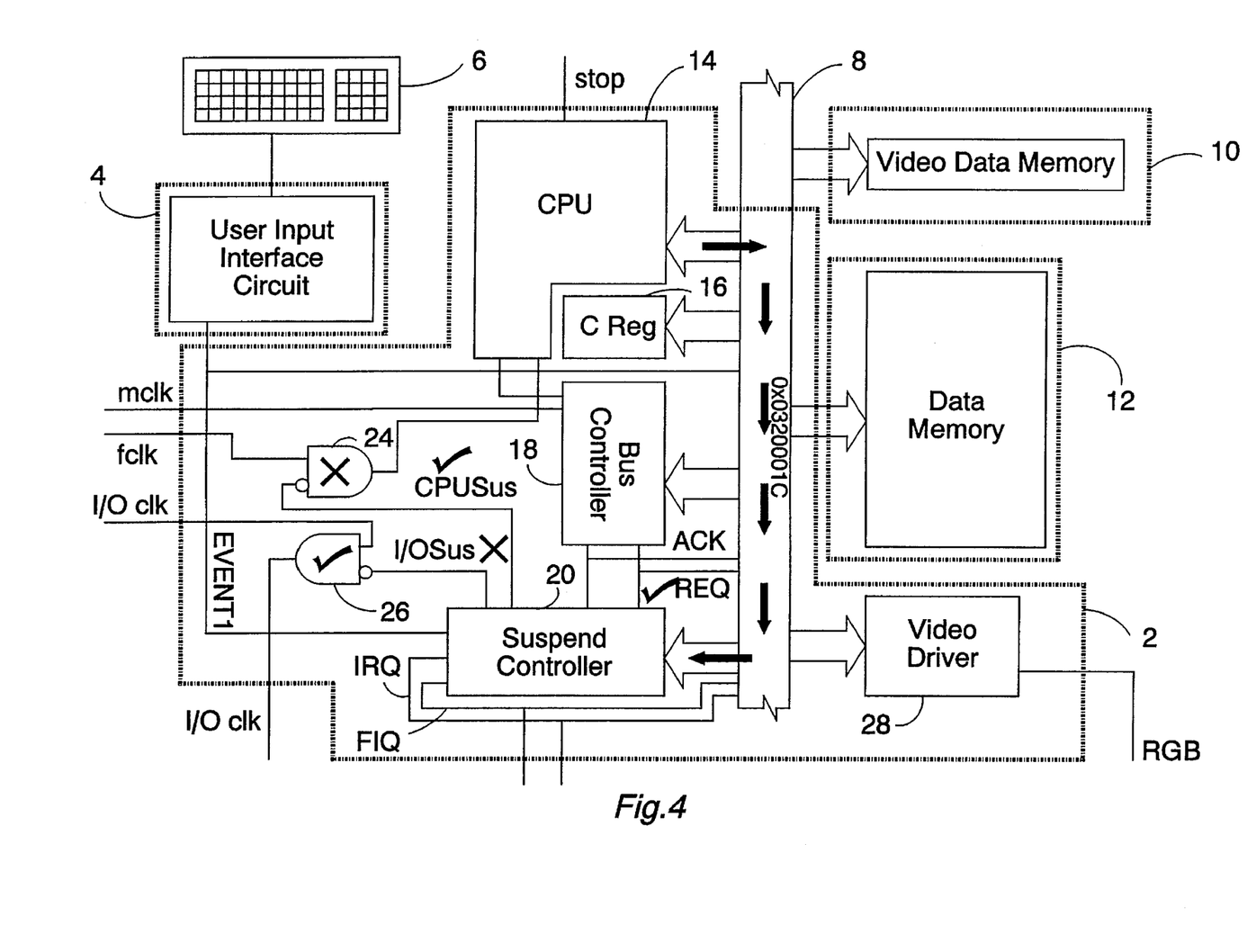

FIG. 4 illustrates entry of the suspend mode. The central processing unit core 14 issues a write request to address 0x0320001C. The suspend controller 20 recognises this write request and asserts and holds the (pseudo) bus request signal REQ supplied to the bus controller 18. The suspend controller also asserts the CPUSus signal that blocks the supply of the fast clock signal fclk to the central processing unit core 14. In this case, the value of the word being written by the central processing unit core 14 has as its least, significant bit (Bit0) a "1" and accordingly, the I/O clk signal is not suspended.

Figure 5:
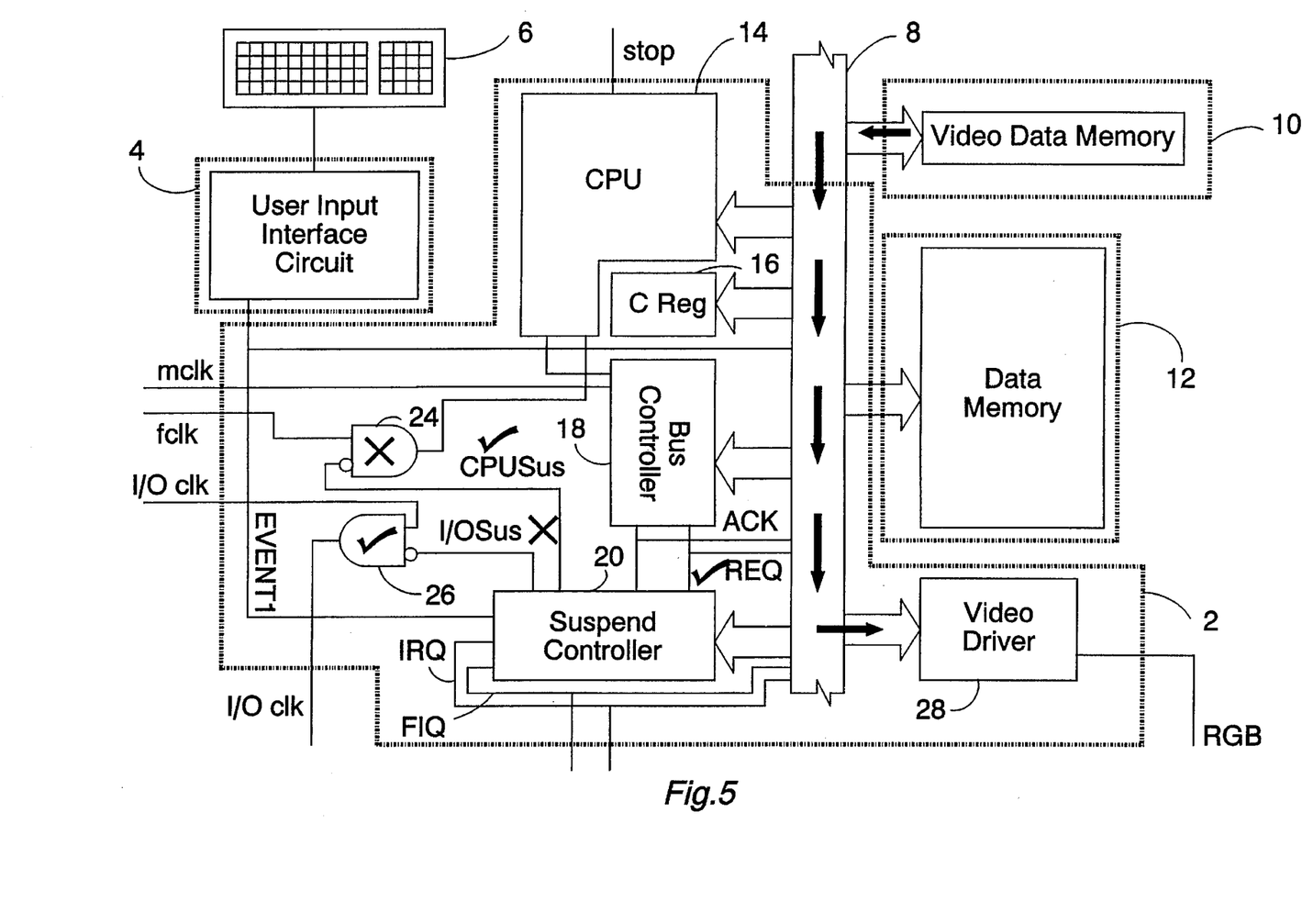

FIG. 5 illustrates the manner in which the clock signal to the central processing unit core 14 may be blocked, so saving power, whilst allowing other circuit elements, such as the video driver circuit 10 and the video data memory 28 to continue to communicate via the signal bus. Such communication allows the video data memory 10 to supply the video data memory 28 and so provide a continuous display output to the user.

Figure 6:
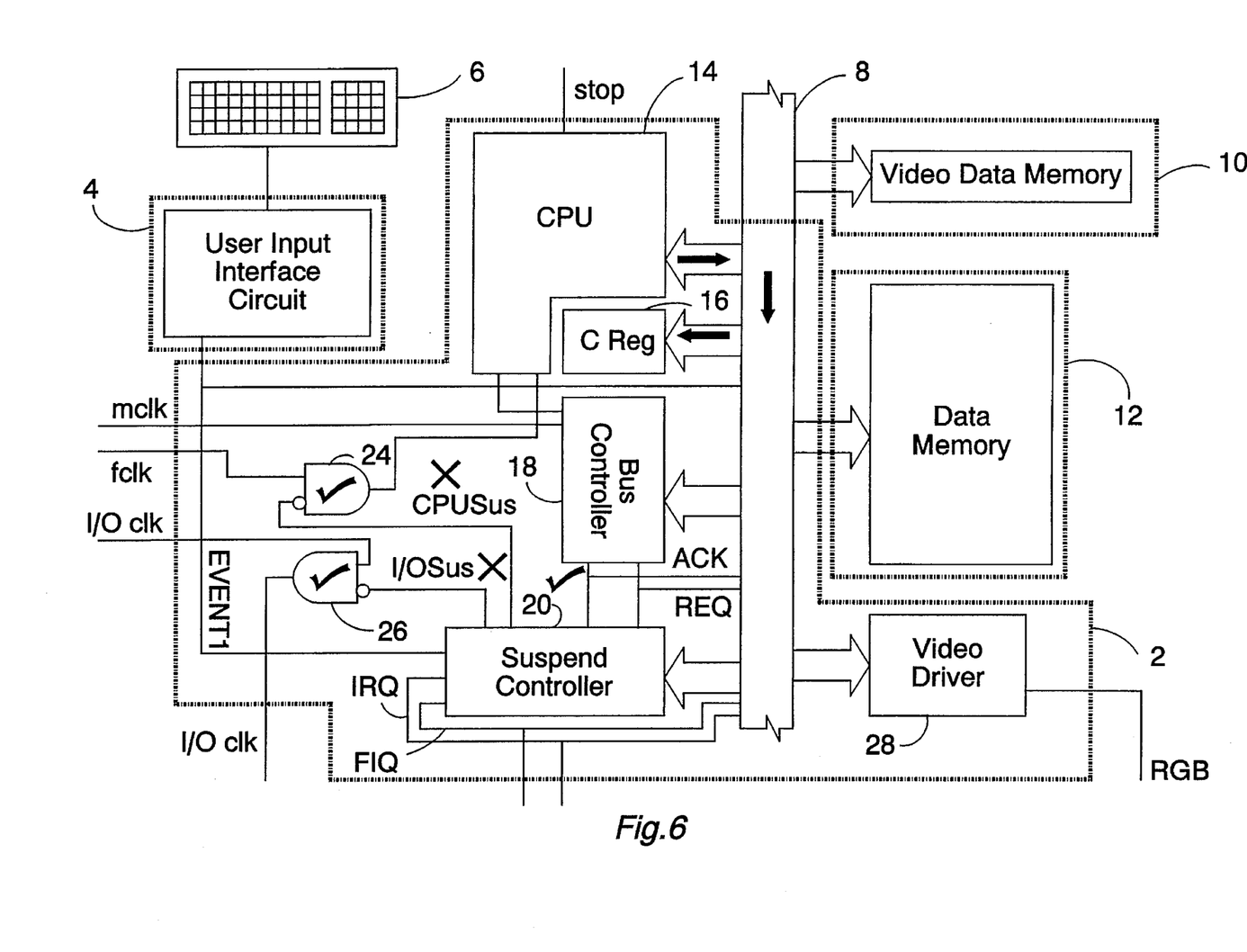

FIG. 6 illustrates the exiting of the suspend mode. A keystroke at the keyboard 6 is detected by the user input interface circuit 4 which then issues an asynchronous event signal EVENT1 that is supplied to the suspend controller 20. The suspend controller 20 reacts by removing the bus request signal REQ and the CPUSus signal and then asserting the (pseudo) bus acknowledge signal ACK. The action of removing the CPUSus signal allows the fast clock signal fclk to again be supplied to the central processing unit core 14. The bus acknowledge signal ACK also unblocks the memory clock signal mclk by the bus controller. The central processing unit core 14 sees the suspend mode as a single write operation of an indefinite length. Having exited the suspend mode, the central processing unit core 14 is again supplied with a clock signal and can recommence operation, such as communicating via the signal bus 8 with the control registers 16 to perform data processing.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:

(i) a central processing unit core driven by a central processing unit clock signal for performing data processing in response to program instructions;

(ii) an asynchronous signal input coupled to said central processing unit core for receiving asynchronous input signals;

(iii) a signal bus for transferring signals between said central processing unit core, data storage means and one or more further circuits all coupled to said signal bus;

(iv) a bus controller for controlling access to said signal bus by said central processing unit, said data storage means and said one or more further circuits and for supplying said central processing unit clock signal to said central processing unit core; (v) clock suspending means responsive to a program instruction initiated write request by said central processing unit core to a predetermined address in said data storage means for issuing a request signal to said bus controller such that said bus controller suspends driving of said central processing unit core by said central processing unit clock signal whilst allowing said data storage means and said one or more further circuits to continue to communicate via said signal bus; and (vi) clock resuming means responsive to an asynchronous input signal applied to said asynchronous signal input issuing an acknowledge signal to said bus controller such that said bus controller resumes driving of said central processing unit core by said central processing unit clock signal.

2. Apparatus as claimed in claim 1, wherein said data storage means includes a video data memory and said one or more further circuits include a video driver circuit such that said video driver circuit may access and refresh said video data memory whilst driving of said central processing unit core by said central processing unit clock is suspended.

3. Apparatus as claimed in claim 1, comprising a plurality of asynchronous signal inputs for receiving a plurality of asynchronous input signals that may serve to resume said central processing unit clock signal.

4. Apparatus as claimed in claim 1, further comprising one or more interrupt signal inputs coupled to said central processing unit core for receiving interrupt signals, said clock resuming means being responsive to received interrupt signals to resume said central processing unit clock signal and said central processing unit core being responsive to received interrupt signals to initiate an interrupt handling routine.

5. Apparatus as claimed in claim 1, wherein said data storage means includes a data register, said predetermined address corresponding to said data register.

6. Apparatus as claimed in claim 1, wherein said central processing unit core is responsive to predetermined program instructions to assert a stop signal that stops clock signal generation such that no communication may take place via said signal bus.

7. Apparatus as claimed in claim 1, wherein said clock suspending means and said clock resuming means comprises a suspend controller circuit block.

8. Apparatus as claimed in claim 1, comprising a user input interface circuit for generating an asynchronous input signal at said asynchronous signal input in response to a user input so as to trigger resumption of driving of said central processing unit core by said central processing unit clock signal.

9. Apparatus as claimed in claim 8, wherein said user input interface circuit comprises a keyboard interface circuit and wherein said central processing unit core and said bus controller together act to suspend said central processing unit clock whilst waiting for a keyboard input signal to said keyboard interface circuit.

10. Apparatus as claimed in claim 1, wherein said central processing unit core, said bus controller, said clock suspending means and said clock resuming means are formed as a central processing unit integrated circuit.

11. Apparatus as claimed in claim 10, wherein said data storage means includes a data register, said predetermined address corresponding to said data register, a random access memory, said random access memory being formed as a random access memory integrated circuit coupled to said central processing unit core, said bus controller, said clock suspending means and said clock resuming means.

12. Apparatus as claimed in claim 1, wherein said clock suspending means suspends a further circuit clock signal driving one or more of said further circuits when suspending said central processing unit clock signal and said clock resuming means resumes said further circuit clock signal when resuming said central processing unit clock signal.

13. Apparatus as claimed in claim 12, wherein said clock suspending means selectively suspends said further circuit clock signal in dependence upon a data value written to said predetermined address.

14. Apparatus as claimed in claims 13, wherein said central processing unit core, said bus controller, said clock suspending means and said clock resuming means are formed as a central processing unit integrated circuit and said further circuit clock signal is an input/output device clock signal that is supplied at an external pin of said central processing unit integrated circuit.

15. A method of processing data, said method comprising the steps of:

(i) driving a central processing unit core by a central processing unit clock signal for performing data processing in response to program instructions;

(ii) receiving asynchronous input signals at an asynchronous signal input coupled to said central processing unit core;

(iii) transferring signals via a signal bus between said central processing unit core, a data memory and one or more further circuits all coupled to said signal bus; and (iv) controlling with a bus controller access to said signal bus by said central processing unit, said data memory and said one or more further circuits;

(v) supplying said central processing unit clock signal from said bus controller to said central processing unit core;

(vi) responding to a program instruction initiated write request by said central processing unit core to a predetermined address in said data storage means by issuing a request to said bus controller such that said bus controller suspends driving of said central processing unit core by said central processing unit clock signal whilst allowing said data storage means and said one or more further circuits to continue to communicate via said signal bus; and (vii) responding to an asynchronous input signal applied to said asynchronous signal input by issuing an acknowledge signal to said bus controller such that said bus controller resumes driving of said central processing unit core by said central processing unit clock signal.

* * * * *